United States Patent [19]

Schoenthaler

[11] 4,072,777
[45] Feb. 7, 1978

[54] METHOD AND APPARATUS FOR FORMING A UNIFORM SOLDER WAVE

[75] Inventor: David Schoenthaler, Lower Makefield Township, Bucks County, Pa.

[73] Assignee: Western Electric Co., Inc., New York, N.Y.

[21] Appl. No.: 811,935

[22] Filed: June 30, 1977

[51] Int. Cl.² .................... B05D 1/18; B05C 3/10
[52] U.S. Cl. ..................... 427/433; 118/63; 118/425; 118/429; 228/37
[58] Field of Search ............... 118/300, 400, 410, 423, 118/429, 506; 228/37; 427/430–433, 434 C, 435, 436

[56] References Cited

U.S. PATENT DOCUMENTS

| | | | |
|---|---|---|---|
| 3,119,363 | 1/1964 | Rieben | 228/37 |
| 3,135,630 | 6/1964 | Bielinski et al. | 118/429 X |
| 3,196,829 | 7/1965 | Elliott et al. | 118/300 |
| 3,217,959 | 11/1965 | Renzo | 228/37 |
| 3,398,873 | 8/1968 | Wegener et al. | 228/37 |
| 3,500,536 | 3/1970 | Goldschmied | 228/37 X |
| 3,565,319 | 2/1971 | Eschenbrucher | 228/37 |
| 3,941,088 | 3/1976 | Renafoldi et al. | 118/429 |

Primary Examiner—Morris Kaplan
Attorney, Agent, or Firm—D. J. Kirk

[57] ABSTRACT

A tapered array of apertures are provided in a wall of a solder pot to permit passage of molten solder therethrough. Molten solder is pumped along an outside channel, perpendicular to the axes of the apertures, and through the apertures to cause the solder pot to overflow with a uniformly distributed wave. The array tapers in the direction of pumped fluid flow.

5 Claims, 4 Drawing Figures

METHOD AND APPARATUS FOR FORMING A UNIFORM SOLDER WAVE

BACKGROUND OF THE INVENTION

1. Field of the Invention

The instant invention relates to a method and apparatus for applying molten solder to articles. In particular, the invention is directed to the formation of a uniformly overflowing solder wave from a solder pot in which the articles are dipped or immersed.

2. Description of the Prior Art

Manufacturers and users of printed wiring boards (PWB's) have been faced with a concern over the solderability of the electrically conductive surfaces of such boards since the onset of mass circuit fabrication technology. Extensive research has been conducted on the various material combinations applicable to the problem of preserving solderability, including both fusible and soluble metallic coatings and organic protective finishes. Additionally, numerous methods of applying coatings or treating the surfaces have been developed over the years. Nevertheless, no one single coating method appears to answer the needs of the industry. Economic considerations, quality requirements, and technological developments in processing materials and techniques have a strong influence on the choice of solderability protection method.

Electroplating a 200 to 300 micro-inch coating of 60/40 tin/lead solder alloy has been the most commonly used method of preserving solderability of the electrically conductive surfaces, for the coating also serves as an etch resist in subtractive circuit fabrication. However, with the advent of additive circuit fabrication techniques, most circuit paths are isolated from a common conductive connection and electroplated solder is not a suitable choice for a coating. A recently developed solder leveling process using high pressure gas jets, has been combined with the application of solder to copper circuit paths by dipping the PWB into molten solder to coat the copper for purposes of preserving solderability. U.S. Pat. No. 3,865,298 which issued to Allen et al. on Feb. 11, 1975 describes an apparatus to implement such a gas leveling process.

The Allen apparatus provides a static, heated, solder pot having a rectangular cross section. A pair of parallel slotted rails extend vertically upward from the solder pot and a pair of air nozzles or knives are disposed above the pot on opposite sides thereof. In operation, the PWB is fluxed, inserted in the slotted rails and urged downward into the solder pot to apply molten solder thereto. The PWB is then removed from the pot by pulling the board upward along the rails while simultaneously directed a gas from the jets at the board to remove excess solder therefrom leaving a uniformly thin protective coating of solder on the copper.

However, in such a static solder pot dross and flux residues accumulate on the top of the body of molten solder and tend to deposit or cling to the PWB as it is being removed from the solder causing an undesirable residue coating on the PWB. One solution to this problem is to place the solder pot within a larger tank of molten solder with the top of the solder pot above the level of the solder in the larger tank. Solder is then pumped from the larger tank directly through a wall of the solder pot to cause the solder pot to continuously overflow and remove most of the dross and flux residues formed on the surface thereof.

Although this solution is a substantial improvement over the static solder pot, problems still arise. The flow of the molten solder into the solder pot causes the shape of the wave of solder overflowing from the pot to be non-uniform, resulting in depressions or low points in the overflowing wave. The dross and flux residues tend to accumulate in such depressions and, undesirably, deposit on the surface of the PWB as it is being removed from the pot resulting in the aforementioned undesirable residue coating.

Accordingly, there is a need for a solder pot for dip or immersion soldering in which a uniform overflowing wave can be formed to continuously remove dross and flux residues from the surface of the molten solder.

SUMMARY OF THE INVENTION

The instant invention precludes the foregoing problem with a method of forming a uniform overflowing solder wave from an open top of a vessel having a rectangular cross section. The method comprises the steps of channeling the solder along the outside surface of the vessel and flowing the molten solder into the vessel through an opening therein, the opening decreasing in size in the direction of the solder flow causing a uniform overflowing solder wave from the top of the vessel.

The instant method is implemented with a vessel having a rectangular cross section and arranged with an open top through which molten solder can overflow. Means are provided to channel the molten solder along the outside surface of the vessel. The vessel has an opening therein which decreases in size in the direction of the channeled solder flow to permit the molten solder to flow therethrough at a constant mass flow rate along the length of the channeling means causing a uniform solder wave to overflow from the solder pot.

DETAILED DESCRIPTION OF THE INVENTION

The instant invention will be described in relation to its use in a solder leveling apparatus. However, such description is for the purpose of exposition and not for limitation. The instant concept will apply to any solder pot or vessel wherein it is desired to have a uniform solder wave overflowing therefrom for the purposes of dip soldering, wave soldering or the like.

In the above-referred to Allen et al. patent relating to a solder leveling apparatus, the solder pot is elongated and rectangular in cross section to accommodate substantially planar PWB's or the like having typical dimensions of 9 inches by 12 inches by 0.065 inch. The molten solder is static and does not overflow the pot. Such an arrangement results in dross and flux residues accumulating on the solder surface which will, in time, disadvantageously tend to cling to the surface of the PWB upon withdrawal from the molten solder resulting in short circuits or a poor quality coating of the conductive circuit paths.

Figure 2:
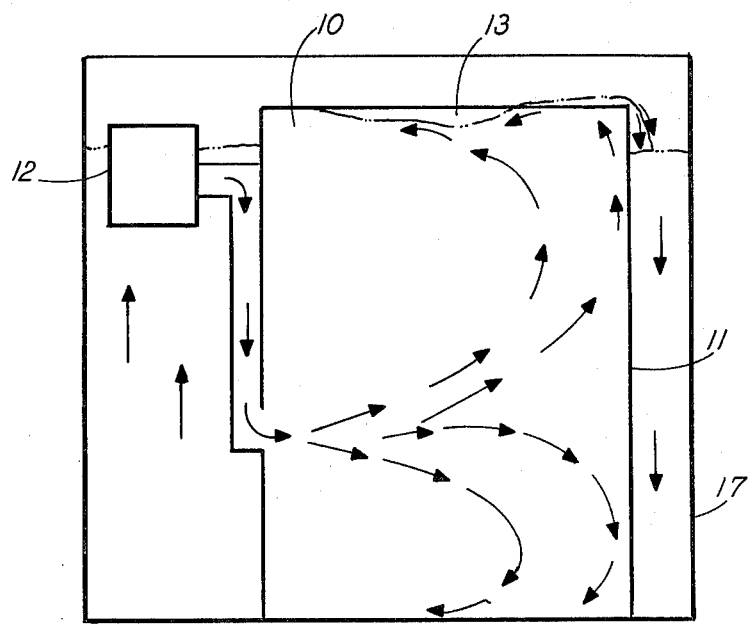
FIG. 2 is a partial cross-sectional view of a prior art solder pot indicating the flow pattern of the molten solder therein.

Clearly, an overflowing solder pot, as is well known in the art, would remove some of the dross and flux residue and will lessen this problem. However, it has been found difficult to obtain a uniform overflowing solder wave. A uniform wave could be generated by placing baffles inside the solder pot to break up the flow, however, such internal baffles would preclude the insertion of the PWB or other articles into the solder pot. FIG. 2 depicts flow patterns of molten solder 10 in a solder pot 11 wherein the solder is fed directly through one of the walls of the pot. The velocity of the solder 10 as it is pumped by pump 12 through the wall carries the solder across the pot 11 to the opposite wall where the velocity head is sharply reduced causing a local increase in the pressure head. This causes the solder 10 to flow upward along the opposite wall (as indicated by the arrows) causing a non-uniform overflowing wave, resulting in an undesirable depression 13 in the wave in which dross and flux residue can accumulate on the solder surface.

Figure 1:
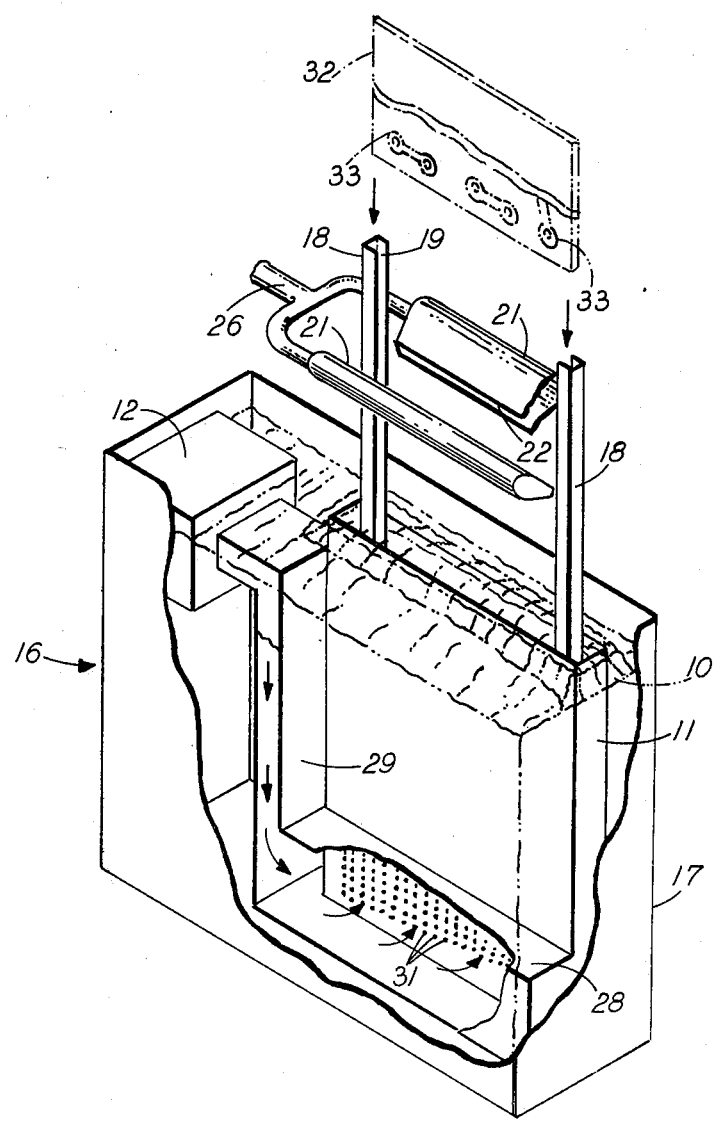
FIG. 1 is an isometric view of a solder leveling apparatus incorporating the instant inventive concepts.

A solder leveling apparatus, which has been modified to overcome this problem and provide a uniform overflow solder wave is generally indicated by the numeral 16 in FIG. 1. The solder leveling apparatus 16 comprises an outer solder chamber 17 with the solder pot 11 disposed therein. A pair of parallel guide members 18—18 having inwardly directed slots 19—19 are mounted within and extend vertically from the solder pot 11. A pair of air knives 21—21 having elongated horizontal openings 22—22 are spaced from and at an angle to the plane of the guide members 18—18. Conduit 26 communicates with the air knives 21—21 and connects to a pressurized hot air or gas supply (not shown).

Figure 3:
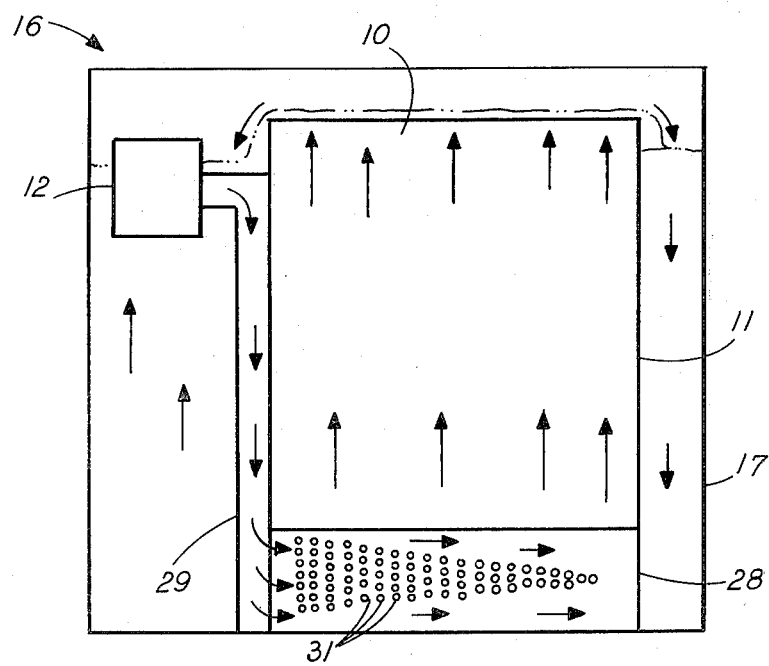
FIG. 3 is a partial cross-sectional view of the instant solder pot indicating the flow pattern of the molten solder therein.

The pump 12, at least partially immersed in the molten solder 10 and located proximate the solder port 11, is connected to a side channel 28 via a piping arrangement 29. The side wall of the solder pot 11 has a tapered array of apertures 31—31 therein (see FIG. 3) through which the molten soder 10 passes to the inside of the solder pot.

In operation, the pump 12 is activated to pump molten solder through the piping arrangement 29 and along the side channel 28. The solder in the side channel 28 flows through the apertures 31—31 which breaks up the flow pattern and changes the velocity head to a pressure head to provide a constant mass flow rate into the solder pot 11 along the length of the side channel. The pattern of flow of the solder 10 is uniformly upward throughout the length of the pot 11, as indicated by the arrows in FIG. 3 resulting in a uniformly smooth wave overflowing the top of the solder pot 11 which continuously removes dross and flux residue from the surface of the solder.

A PWB 32 having electrically conductive interconnecting paths 33—33 thereon (see FIG. 1) is then inserted in the slots 19—19 of the guide members 18—18 and urged downward into the solder pot 13 for approximately 4 seconds. The PWB 32 is then pulled upward through the overflowing solder wave and past the air knives 21—21 which are activated to provide a blast of hot gas thereon, which clears through-holes and levels the solder.

In a particular working embodiment of the instant invention, the solder pot 11 has a depth of 26.25 inches with a cross section of 2.0 inches by 20.33 inches which accomodated a PWB 32 that is 18 inches by 24 inches by 0.25 inch. The pump 12 was of the centrifugal type which pumped from 2 to 100 pounds of molten solder per second. The tapered array of apertures 31—31 are comprised of a multitude of circular holes in the side of the solder port 11. The apertures were all approximately 0.10 inch in diameter on approximately 0.16 inch centers. The number of apertures 31—31 decreased in the direction of the flow of molten solder 10 along the channel 28 and the array was tapered from 1.5 inches down to 0.25 inch. It is also contemplated that the array of apertures could be other than circular (i.e., rectangular, triangular etc.) and vary in size as long as the total amount of the opening decreases in the direction of the flow of molten solder.

Figure 4:
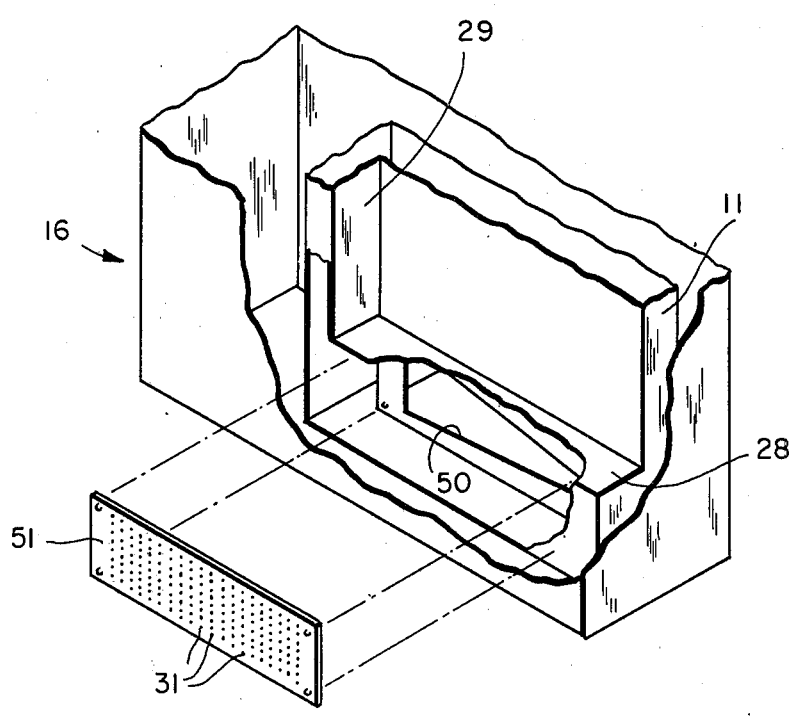
FIG. 4 is a partial isometric view of the solder leveling apparatus depicting a further aspect of the instant invention.

Although the instant invention has been described in terms of flowing the molten solder 10 through a plurality of apertures 31—31 in the side of a solder pot 11, it should not be so limited. The apertures 31—31 may be replaced with an opening 50 (see FIG. 4) in one or more of the walls or bottom of the solder pot 11, which opening decreases in size in the direction of the flow of the molten solder 10 along the channel 28. Additionally, the tapered array of apertures 31—31 may be formed by placing an apertured plate 51 over the tapered opening 50 in the bottom or one or more side walls of the solder pot 11.

What is claimed is:

1. A soldering apparatus arranged to form a uniform overflowing molten solder wave comprising a vessel having a rectangular cross section and which is open at the top, the apparatus further comprising:
    means for channeling the molten solder along the outside surface of the vessel; and
    said vessel having an opening therein which decreases in size in the direction of the solder flow to cause the molten solder to flow from the channeling means into the vessel at a constant mass flow rate along the length of said channeling means resulting in a uniform overflow wave of solder from the top of the vessel.

2. The soldering apparatus as set forth in claim 1, further comprising:
    means for covering said opening with a cover having a plurality of apertures therein.

3. The soldering apparatus as set forth in claim 1 wherein the opening is formed by a multitude of apertures arranged in a tapered array in at least one side or the bottom of the apparatus.

4. A method of forming a uniform overflowing molten solder wave from a vessel having a rectangular cross section and which is open at the top, comprising the steps of:
    channeling the molten solder along the outside surface of the vessel; and
    flowing the molten solder into the vessel through a tapered opening therein, the opening decreasing in size in the direction of the solder flow to cause the molten solder to flow therethrough at a constant mass flow rate causing a uniform solder wave to overflow from the top of the vessel.

5. The method as set forth in claim 4 which is characterized by flowing the molten solder through a tapered array of equal size openings in the vessel to cause the molten solder to flow therethrough at a constant mass flow rate causing a uniform solder wave to overflow from the top of the vessel.

* * * * *